United States Patent [19]

Bousquet et al.

[11] Patent Number: 4,497,703

[45] Date of Patent: Feb. 5, 1985

[54] HYDROTREATMENT FOR PETROLEUM CUTS WITH OFFRETITE

[75] Inventors: Jacques Bousquet, Irigny; Claude Guguen, Septeme Pont L'Eveque, both of France

[73] Assignee: Elf France, Paris, France

[21] Appl. No.: 479,212

[22] Filed: Mar. 28, 1983

[30] Foreign Application Priority Data

Apr. 5, 1982 [FR] France ................. 82 05876

[51] Int. Cl.$^3$ ............... C10G 45/12; C10G 47/20
[52] U.S. Cl. .................. 208/111; 208/216 R
[58] Field of Search ............. 208/111, 216 R

[56] References Cited

U.S. PATENT DOCUMENTS

| | | | |
|---|---|---|---|
| 3,474,025 | 10/1969 | Garwood | 208/111 |
| 3,575,846 | 4/1971 | Hamner et al. | 208/111 |
| 3,578,398 | 5/1971 | Jenkins | 208/111 X |
| 3,594,311 | 7/1971 | Frilette et al. | 208/111 |
| 3,644,198 | 2/1972 | Wilhelm | 208/111 |
| 4,202,758 | 5/1980 | O'Hara et al. | 208/143 |
| 4,213,850 | 7/1980 | Riddick, Jr. et al. | 208/216 R |
| 4,255,282 | 3/1981 | Simpson | 208/216 R |
| 4,259,174 | 3/1981 | Chen et al. | 208/111 |
| 4,339,353 | 7/1982 | Weisz et al. | 208/111 X |

*Primary Examiner*—Delbert E. Gantz
*Assistant Examiner*—O. Chaudhuri
*Attorney, Agent, or Firm*—Burgess, Ryan & Wayne

[57] ABSTRACT

The present invention concerns a hydrotreatment process for petroleum cuts, in order to achieve simultaneously their desulfurization and the improvement of their flow properties.

The process comprises treating the cuts in the presence of a catalytic system based on a zeolitic crystalline silico aluminate of the offretite type, wherein the synthetic offretite used has a crystalline structure identical to natural offretite and has the chemical formula $(M_1 M_2 ...)_2(Al_2O_3)(SiO_2)_y$ in which y is comprised between 10 and 50, $M_1$ and $M_2$ are selected from among cations of group I and II of the Periodic Table of Elements and this offretite is associated with a bimetallic catalyst comprising a mixture of an oxide or sulfide of a metal selected from among the group comprising chromium, molybdenum and tungsten with an oxide or a sulfide of a metal selected from among the group comprising iron, cobalt and nickel.

10 Claims, No Drawings

HYDROTREATMENT FOR PETROLEUM CUTS WITH OFFRETITE

The present invention concerns a hydrotreatment process for petroleum cuts in order to achieve simultaneously their desulfurization and the improvement of their flow properties.

BACKGROUND OF THE INVENTION

It is well known (J. E. MARECHAL—VI Petroleum Congress section III paper 1 PD 7), that the cold flow problems of the petroleum cuts and gasoils in particular, are related to the content of long chain linear paraffins (long n-paraffins in these petroleum cuts). The hydrocarbon petroleum cuts treated according to the process contain paraffins or are themselves pure or mixed paraffins. By way of example, the gasoils of direct distillation contain a large proportion of $C_{12}$–$C_{23}$ n-paraffins. The heaviest cuts may contain longer chain $C_{12}$–$C_{30}$ paraffins, for example. These hydrocarbon petroleum cuts can thus be gasoils whose initial distillation point is generally at least equal to 150° C. and the final point, normally fixed at 450° C., can reach 530° C. when the cuts are obtained by distillation under vacuum.

In the latter case, it is possible to obtain lubricants from these cuts provided there is a previous treatment to eliminate the aromatic compounds by hydrorefining or extraction by solvent. The problem thus consists in lowering the flow point of the product obtained, without too greatly diminishing its viscosity index, while ensuring a suitable yield to the operation. The flow point of lubricants is defined by standard AFNOR T 60105.

The gasoils, in order to be of a commercial quality, must satisfy the specifications of motor gasoils and domestic fuels. From this point of view, it can be noted that the most restrictive characteristics are the flow characteristics and the sulfur content.

The most currently used flow characteristics for the gasoils are the flow point and cloud point (C.P.) defined by standard AFNOR T 60105 T and the limit temperature of filterability normally designated by the sign (LTF) defined by standard AFNOR N 07.02.

Generally, the gasoil cuts of direct distillation must be made to conform to the specifications by various appropriate treatments.

Two types of solutions have been proposed in order to improve the flow characteristics of the petroleum cuts.

The first solution consists in adding adjuvants. The second solution consists in applying to them a catalytic hydrotreatment called "dewaxing".

When the sulfur content is too high, a desulfurization treatment is generally carried out in the presence of hydrogen. The catalytic hydro desulfurization (CHD) made possible by contact with a cobalt-molybdenum type catalyst supported by alumina. In the present invention, the hydrodesulfurization is ensured by the claimed catalyst.

Certain dewaxing processes use cobalt-molybdenum type hydrodesulfurization catalysts deposited on acidic supports. These processes, consume hydrogen and provide low yields of gasoils, are not the most economically interesting.

Other dewaxing processes are known. The processes use platinum-based catalysts deposited on halogenated alumina or alumina-silica or use zeolite based catalysts which may contain precious metals.

The platinum catalysts deposited on halogenated alumina or aluminasilica necessitate operating conditions (temperature, pressure, spatial velocity) that in certain cases render the process difficult to integrate economically with the hydrodesulfurization which, in a classical refining installation, remains necessary.

Zeolite based catalysts have featured in numerous patent applications over the last decade. Examples of zeolite based catalysts are disclosed in French Pat. Nos. 1.496.969 and 2.217.408, U.S. Pat. Nos. 3,663,430, 3,876,525 and 3,578,399.

Zeolites described in these patents belong to the family of mordenites with an admixture of precious metals, especially platinum or palladium, or zeolite Z SM 5 of the company MOBIL or further belong to the family of offretites (European Pat. No. 16.530 in the name of MOBIL).

BRIEF SUMMARY OF THE INVENTION

The present invention concerns a hydrotreatment process for petroleum cuts which simultaneously achieves desulfurization and improvement of their flow properties by conversion of n-paraffins. The process comprises treating these cuts at a temperature of 200° to 500° C., a pressure of 1 to 80 bars, a liquid spatial velocity of the load (LSV) of 0.3 to 6 $m^3/m^3/h$, the hydrogen/hydrocarbon molar ratio being comprised between 2 and 10 in the presence of a catalytic system based on a zeolite crystalline aluminosilicate of the offretite type. This process is characterized in that the synthetic offretite used has a crystalline structure identical to natural offretite and shows a silica/alumina molar ratio comprised between 10 and 50. The offretite is associated with a bi-metallic catalyst comprising a mixture of an oxide or sulfide of at least one metal selected from among the group comprising chromium, molybdenum and tungsten with an oxide or a sulfide of at least one metal selected from among the group comprising iron, cobalt and nickel.

It was noted that the catalysts according to the invention were active for the cracking and isomerisation of n-paraffins contained in the petroleum cuts thus improving the flow properties, especially cloud point as well as ensuring a good desulfuration of the cuts.

DETAILED DESCRIPTION OF THE INVENTION

The offretites present in the catalyst according to the invention are synthetic aluminosilicates that have a silica/alumina molar ratio comprised between 10 and 50 and, preferably, comprised between 15 and 30 and have a crystalline structure identical to that of natural offretite.

Natural offretite is well described by J. M. BENNETT and J. A. GARD (Nature 219 1005 (1967)).

Offretite belongs to group 2 of the classification by MEIER (W. M. MEIER Molecular Sieves, Society of Chemical Industry, London 1968) universally recognised and the X-ray diffraction spectrum has significant peaks as shown in TABLE I

TABLE I

| hkl | d(A) | I | hkl | d(A) | I | hkl | (A) | I |
|-----|------|-----|-----|-------|-----|-----|-------|---|
| 100 | 11.50 | 100 | 310 | 3.190 | 17 | 331 | 2.126 | 4 |
| 110 | 6.64 | 20 | 311 | 2.942 | 3 | 303 | 2.110 | 2 |
| 200 | 5.76 | 35 | 400 | 2.880 | 64 | 421 | 2.091 | 2 |

TABLE I-continued

| hkl | d(A) | I | hkl | d(A) | I | hkl | (A) | I |
|---|---|---|---|---|---|---|---|---|
| 201 | 4.581 | 4 | 212 | 2.858 | 15 | 510 | 2.068 | 2 |
| 210 | 4.352 | 59 | 401 | 2.693 | 3 | 511 | 1.995 | 2 |
| 300 | 3.837 | 43 | 320 | 2.642 | 4 | 502 | 1.967 | 2 |
| 211 | 3.774 | 11 | 410 | 2.510 | 20 | 430 | 1.893 | 1 |
| 102 | 3.600 | 3 | 500 | 2.300 | 5 | 520 | 1.844 | 3 |
| 220 | 3.322 | 22 | 420 | 2.177 | 2 | | | |

The elementary composition of natural offretite is represented by the formula:

$$(M_1M_2 \ldots )_2Al_4Si_{14}O_{36}14H_2O$$

Synthetic offretites according to the invention can be defined by the formula:

$$(M_1M_2 \ldots )_2(Al_2O_3)_x(SiO_2)_y$$

in which:
y is comprised between 10 and 50, and preferably between 15 and 30,
$M_1$ and $M_2$ are selected from among cations of group I and II of the Periodic Table of Elements.

The synthesis of zeolites consists in crystallizing at a temperature between 0° and 300° C. oversaturated alkaline solutions of freshly precipitated alumina and silica gels. The synthesis of open structure zeolites generally necessitates the presence of an agent around which the network of the zeolite can grow. In the majority of syntheses, the agents used are quaternary elements of group V of the periodic table.

The synthesis of the offretite zeolite allows the silica and alumina contents to be modified.

The original cations can be partially replaced according to well known techniques by exchanging these ions by other ions, such as for example, metallic ions, ammonium ions, protons or mixtures of cations.

Thus, the original cations of the offretite can be exchanged at 89% with an ammonium acetate solution and the catalyst thus obtained treated 15 hours at 500° C. in the presence of air, then 12 hours at 510° C. in the presence of hydrogen.

In order to confer a hydrodesulfurization function on the catalyst, the synthetic offretite according to the invention is associated with a bimetallic catalyst.

It is possible to proceed either by exchange of the original cations with a nickel, iron or cobalt salt and a molybdenum, chromium or tungsten salt, or by the association of the offretite with a bimetallic catalyst, composed of the metals mentioned herein-above deposited on an alumina, silica or silica/alumina support.

The bimetallic catalyst is sulfided for 12 hours under hydrogen at 320° C. by a hydrocarbon feed to which has been added a sulfiding agent such as dimethyldisulfide.

According to a particular operation of the process, the bimetallic catalyst supported on the synthetic offretite is composed of a mixture of a nickel salt with a molybdenum salt.

It can be worthwhile to incorporate the offretite with an active or inert substance such as, for example, alumina, clays or furthermore, binary compositions of silica-alumina, silica-magnesia etc.

Operating conditions are those normally used in dewaxing processes.

The temperature is comprised between 200° and 500° C. and more usually between 250° and 420° C.

The "liquid" spatial velocity (LSV) of the feed, expressed in $m^3/m^3/h$, is generally comprised between 0.3 and 6.

The total pressure prevailing in the reaction zone is generally comprised between 1 and 80 bars. It will preferably be between 25 and 60 bars.

The hydrogen/hydrocarbon molar ratio is generally comprised between 2 and 10.

The process is illustrated by the following non-limitative examples:

The feeds used are petroleum cuts of the gasoil type. The characteristics of these gasoils are given in TABLE 2 herein-below.

EXAMPLE 1

In this example, given by way of comparison, gasoil 1 is treated in the following operation conditions:

| total pressure | 35 bars |
|---|---|
| $\dfrac{\text{hydrogen}}{\text{hydrocarbon}}$ | 300 1/1 |
| LSV | 1 h$^{-1}$ |
| temperature | 350–420° C. |

TABLE 2

| | GASOIL 1 | GASOIL 2 |
|---|---|---|
| Density at 15° C. | 0,839 | 0,850 |
| Sulfur (% weight) | 0,41 | 1,43 |
| (°C.) LTF | −3 | +4 |
| C.P. | −1 | +8 |
| ASTM distillation | | |
| P.I. | 140 | 201 |
| 5 | 165 | 277 |
| 50 | 262 | 297 |
| 95 | 380 | 366 |
| PF | 397 | 373 |

LTF Limit temperature of filtrability
CP Cloud point

The catalyst comprises offretite, in which the cations initially present in the crystalline structure have been exchanged by ammonium ions of an ammonium acetate solution. Five successive exchanges allowed obtention of an exchange amount of sodium and potassium ions of 89%.

The catalyst was thereafter treated for 15 hours at 500° C. in the presence of air. This thermal treatment has the effect of transforming the ammonium ions into ammonium gas that is released and into protons.

Prior to the catalyst test, the catalyst is treated with hydrogen for about 12 hours at 510° C. The activity of the catalyst is evaluated by recording the corresponding drops in limit temperature of filtrability (ΔLTF) and cloud point (ΔCP).

The drop is measured in °C. by the difference between the values corresponding to the feed and to the liquid product. The results are given in Table 3 with respect of the duration of the test and the reaction temperature. The activity of the catalyst in the desulfurization reaction is measured by the desulfurization percentage (HDS) defined by the following equation:

$$HDS = \frac{\text{percentage } S \text{ in the feed} - \text{percentage } S \text{ in the product}}{\text{percentage } S \text{ in the feed}} \ 100\%$$

TABLE 3

| number of days on stream | HDS | ΔLTF (°C.) | ΔCP (°C.) | temperature of the reactor |
| --- | --- | --- | --- | --- |
| 1 | 25 | −8 | −6 | 350° C. |
| 3 | 22 | −5 | −4 | 350° C. |
| 5 | 25.5 | −3 | −3 | 400° C. |
| 10 | 18 | −5 | −5 | 420° C. |

Examination of this table shows that the use of offretite allows efficient improvement of the flow properties of the gasoils but it is necessary to increase the reaction temperature with time in order to maintain the activity of the catalyst constant with respect to the flow properties of the feed. On the other hand, the desulfurization activity is low and progressively drops with time.

EXAMPLE 2

In this comparative example, the catalyst of the preceding examples is used to treat gasoil no. 2 under a total pressure of 45 bars, the other conditions being identical to the preceding case.

The results are shown in TABLE 4.

TABLE 4

| number of days on stream | HDS | ΔLTF (°C.) | ΔCP (°C.) | temperature in the reactor |
| --- | --- | --- | --- | --- |
| 1 | 18 | −5 | −5 | 380° C. |
| 3 | 20.3 | −5 | −5 | 380° C. |
| 5 | 20.5 | −3 | −4 | 400° C. |
| 10 | 15 | −4 | −4 | 440° C. |

EXAMPLE 3

In this example, effected according to the invention, the offretite is associated with a bimetallic catalyst comprising nickel oxide and molybdenum oxide (4 and 11% respectively) on a gamma type alumina. The catalytic bed comprises a layer, of this catalyst, and thereafter the offretite such as described in Example 1.

Prior to the test it is necessary to proceed to a sulfiding of the catalyst in order to transform the nickel and molybdenum oxides into nickel and molybdenum sulfides that are the active species in the desulfuration reaction.

With this purpose, a petroleum cut known as naphta containing 3% dimethyl-disulfide is contacted with the catalyst at 320° C. for 12 hours under the following conditions:

| LSV | $2 h^{-1}$ |
| --- | --- |
| hydrogene/hydrocarbon | 150 l/l |
| overall pressure | 35 bars |

The gasoil treated is gasoil no. 2.
The results are shown in TABLE 5.

TABLE 5

| number of days on stream | HDS | ΔLTF (°C.) | ΔCP (°C.) | temperature of the reactor |
| --- | --- | --- | --- | --- |
| 1 | 98 | −6 | −6 | 330° C. |
| 5 | 95 | −5 | −5 | 350° C. |
| 10 | 98 | −6 | −7 | 360° C. |
| 20 | 97 | −6 | −6 | 360° C. |

It is clearly shown that the use of a molybdenum nickel catalyst is beneficial for desulfuration activity of the catalytic bed and for its stability.

EXAMPLE 4

In this example according to the invention, nickel oxide and molybdenum oxide are deposited on the offretite by successive impregnation with the nickel and molybdenum salts. It is also possible to use exchange techniques currently described in the prior art. The gasoil treated is gasoil no. 2. The results are shown in TABLE 6.

TABLE 6

| number of days on stream | HDS | ΔLTF (°C.) | ΔCP (°C.) | temperature of the reactor |
| --- | --- | --- | --- | --- |
| 1 | 96 | −6 | −6 | 330 |
| 5 | 95 | −5 | −5 | 360 |
| 10 | 96 | −6 | −7 | 365 |
| 20 | 97 | −6 | −6 | 360 |

We claim:

1. A hydrotreatment process for petroleum cuts containing sulfur for simultaneous desulfurization and improvement of flow properties by conversion of n-paraffins, comprising contacting the sulfur containing cuts at a temperature of 200° to 500° C., a pressure of 1 to 80 bars, a liquid spatial velocity of the load (LSV) of 0.3 to 6 m³/m³/h, with hydrogen at a hydrogen/hydrocarbon molar ratio between 2 and 10, in the presence of a catalytic system based on a synthetic zeolitic crystalline silico aluminate of the offretite structure having the chemical formula $(M_1, M_2 \ldots)_2 (Al_2O_3)(SiO_2)_y$ wherein y is between 10 and 50, $M_1$ and $M_2$ are selected from cations of the groups I and II of the Periodic Table of Elements, the offretite is impregnated with a mixture of oxides or sulfides of at least one metal selected from the group consisting of chromium, molybdenum and tungsten with an oxide or a sulfide of at least one metal selected from the group consisting of iron, cobalt and nickel.

2. A process according to claim 1, wherein the original offretite cations are at least partially exchanged with metallic ions, ammonium ions or protons, taken separately or in admixture.

3. A process according to claim 1 wherein the cations of Group I of the Periodic Table of Elements are the sodium and potassium ions of offretite and are exchanged at about 89% with an ammonium acetate solution, and the thus obtained composition is treated for 5 hours at 500° C. in the presence of air, then for 12 hours at 510° C. in the presence of hydrogen, prior to being used in the process.

4. A process according to claim 1, wherein the cations of groups I and II of the Periodic Table of Elements are the potassium and sodium ions of the offretite and are exchanged with a nickel, iron or cobalt salt, and a molybdenum, chromium or tungsten salt to provide a hydrodesulfurization function to the catalyst, and thereafter sulfiding the catalyst by contact with hydrogen and a hydrocarbon feed to which has been added a sulfiding agent.

5. A process according to claim 1 wherein said metals impregnated in the offretite comprises a mixture of a nickel compound and a molybdenum compound.

6. A process according to claim 1 wherein the silica/alumina molar ratio is between 15 to 30.

7. A process according to claim 1, wherein the offretite is mixed with a substance selected from the group consisting of clay, alumina or a binary composition of silica-alumina, or silica-magnesia.

8. A process according to claim 1 wherein the hydrocarbon feed is a gasoil petroleum cut.

9. The process of claim 1 wherein pressure is between about 25 and 60 bars.

10. The process of claim 4 wherein the sulfiding agent is dimethyldisulfide.

* * * * *